US00RE46627E

(19) United States
(12) Reissued Patent
Hunter

(10) Patent Number: US RE46,627 E
(45) Date of Reissued Patent: Dec. 12, 2017

(54) HAND HELD PUNCHES FOR USE IN MAKING INDIVIDUAL JEWELRY DISPLAY CARDS AND KIT ENCOMPASSING SAME

(71) Applicant: Aleathia G. Hunter, Milford, PA (US)

(72) Inventor: Aleathia G. Hunter, Milford, PA (US)

(21) Appl. No.: 14/545,830

(22) Filed: Jun. 25, 2015

Related U.S. Patent Documents

Reissue of:
(64) Patent No.: 8,763,503
Issued: Jul. 1, 2014
Appl. No.: 12/928,694
Filed: Dec. 15, 2010

U.S. Applications:
(60) Provisional application No. 61/336,428, filed on Jan. 22, 2010.

(51) Int. Cl.
*B26D 5/08* (2006.01)
*B26F 1/00* (2006.01)
*B26F 1/32* (2006.01)
*B26D 5/10* (2006.01)

(52) U.S. Cl.
CPC ..... *B26F 1/32* (2013.01); *B26D 5/08* (2013.01); *B26D 5/10* (2013.01); *Y10T 83/222* (2015.04); *Y10T 83/8776* (2015.04); *Y10T 83/8785* (2015.04); *Y10T 83/885* (2015.04); *Y10T 83/8821* (2015.04); *Y10T 83/8825* (2015.04); *Y10T 83/8832* (2015.04); *Y10T 83/9425* (2015.04)

(58) Field of Classification Search
CPC ..... B26D 5/08; B26D 5/10
USPC ..... 83/167, 468, 613, 616–620, 624–627, 83/582, 588, 523, 563, 564, 566, 568, 83/599; 30/358, 363
See application file for complete search history.

(56) References Cited

U.S. PATENT DOCUMENTS

| | | | | |
|---|---|---|---|---|
| 28,713 | A * | 6/1860 | Hills | 193/1 |
| 777,823 | A | 12/1904 | Webster et al. | |
| 2,237,266 | A | 4/1941 | Weil | |
| 2,676,699 | A | 4/1954 | Friedman | |
| 4,732,269 | A * | 3/1988 | Roy | 206/751 |
| 4,739,878 | A | 4/1988 | DiDomenico | |
| 4,880,117 | A | 11/1989 | Garganese | |
| 5,697,278 | A * | 12/1997 | Shun-Yi | 83/588 |
| 6,089,137 | A * | 7/2000 | Lee | 83/621 |
| 6,428,248 | B1 | 8/2002 | Lee | |
| 6,471,053 | B1 * | 10/2002 | Feibelman | 206/6.1 |

(Continued)

*Primary Examiner* — Cary Wehner
(74) *Attorney, Agent, or Firm* — Sandra M. Kotin

(57) ABSTRACT

Personal cutting devices in the form of hand held punches for producing jewelry display cards include two aligned templates having identical patterns of apertures and being securely mounted in a frame such that a space between the templates accommodates a piece of cardstock. There is a spring biased movable member having elongate cutting elements designed to pass through the apertures in both templates, and an activation lever on which indicia is printed to show the aperture patterns produced by the punches. A housing protects the mechanism. Each punch is specifically designed to produce a display card that can hold and display a single article of jewelry such as a pair of earrings, a necklace or a brooch. The punches vary in size according to the template patterns. The punches enable the jewelry designer to use any card stock, including a business card, to display an article of jewelry.

9 Claims, 3 Drawing Sheets

(56) References Cited

U.S. PATENT DOCUMENTS

| | | | | |
|---|---|---|---|---|
| 6,752,058 | B2 * | 6/2004 | Oh | 83/620 |
| 7,328,821 | B2 * | 2/2008 | Dedo | 223/85 |
| D583,239 | S * | 12/2008 | Crowley | D9/457 |
| 7,654,183 | B2 * | 2/2010 | Marks | 83/618 |
| 7,726,227 | B2 | 6/2010 | Chan | |
| 7,739,936 | B2 | 6/2010 | Chan | |
| 8,096,217 | B2 * | 1/2012 | Chan | 83/167 |
| 2005/0039590 | A1 | 2/2005 | Weng | |
| 2008/0066599 | A1 * | 3/2008 | Aniceto et al. | 83/582 |
| 2008/0168877 | A1 * | 7/2008 | Chan | 83/685 |

* cited by examiner

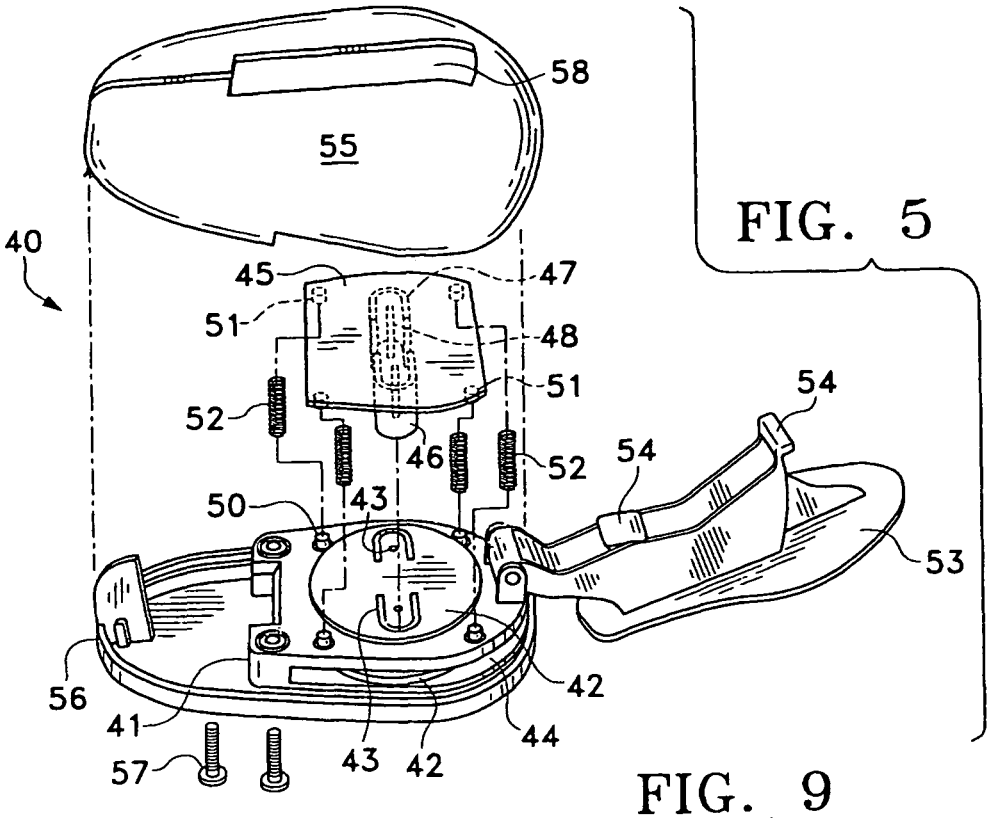
FIG. 5
FIG. 9
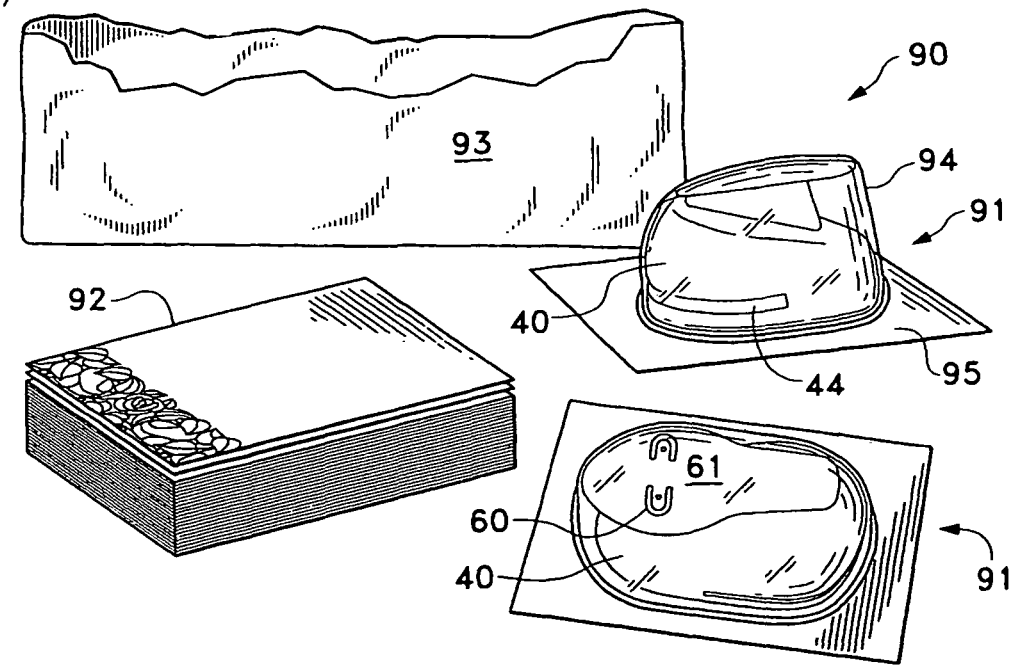

HAND HELD PUNCHES FOR USE IN MAKING INDIVIDUAL JEWELRY DISPLAY CARDS AND KIT ENCOMPASSING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application discloses substantially the same invention disclosed in Provisional Patent Application Ser. No. 61/336,428 filed on Jan. 22, 2010.

FIELD OF THE INVENTION

The instant invention relates to hand-held punches for making individual jewelry display cards with each punch producing a card for the display of a specific jewelry article, and a kit containing at least two punches and a packet of cards.

BACKGROUND OF THE INVENTION

Jewelry articles may often be displayed on stands, cards and in boxes. Often one card or stand can exhibit several articles, usually of the same type, i.e., earrings, rings, brooches, etc. Jewelry boxes often contain a card or other insert with the pin holes, scoring, or slits necessary to display a specific article. All of the jewelry display cards and boxes may be manufactured in large quantities at factories and may be sent, on order, to jewelry dealers, department and other specialty stores. Display cards for use by high-end stores and for insertion into jewelry boxes may often be made from flocked card stock to simulate velvet.

Factory made jewelry display cards may be made by stamping or striking the perforations, cut lines, fold lines and tabs, into large pieces of cardstock. The cards may often be assembled with boxes to hold and display the jewelry items. A number of display cards may often be struck from a single large piece of card stock. The individual cards may be outlined by perforations or score cut lines so that they may be separated from the large piece of card stock. This separation may be accomplished at the point of manufacture, or the separation may be made at the final destination.

DiDomenico, in U.S. Pat. No. 4,739,878 teaches a display assembly whereby a plurality of display cards is struck from a single sheet of card stock. The resulting composite sheet can be used to display a number of pairs of earrings. Each of the individual cards can display either post or wire hook earrings. The earrings can be packaged and shipped on the composite sheet. At the retail facility, the individual cards can be separated from the composite sheet and displayed by being suspended over a bar or rod. DiDomenico's individual cards have ears on which to hang the earrings and shaped tabs which can serve as hooks to hang the cards. These composite sheets are made by large stamping machines.

Garganese teaches a card assembly having three layers adhered one to the other using an adhesive. Double pieces are machine scored into large cardstock and then separated from the whole, folded over and assembled. A retaining card holds a ring between the two layers. Each assembly is used to securely hold and display a single ring. (U.S. Pat. No. 4,880,117) In U.S. Pat. No. 777,823, Webster et al. teach a single card stamped with a series of pairs of vertical slits that can be used to hold a number of rings. Each ring is pushed into the opening formed by depressing the piece between each pair of slits. The ring is held in place from behind the card by a fastener. This card is designed to hold multiple rings. Weil discloses a suitably stamped card that can be used to display a series of like items. (U.S. Pat. No. 2,237,266) In both of the latter two patents the cards cannot be further separated and are not designed to display a single item. Friedman, in U.S. Pat. No. 2,676,699, teaches a display card that holds a single jewelry item or a pair of earrings. This individual card is suitably scored so that it can be folded to display the item or to form a box enclosure containing the item. When folded to form the box the jewelry can be seen through openings in the top of the box. All of these display cards and assemblies must be stamped from large pieces of cardstock by machine at appropriate facilities and therefore must be ordered in substantial quantities. They are for use by jewelry factories and large-scale retailers.

Jewelry making has become a widespread craft extending from designers making pieces for friends and family to experienced craftsmen whose pieces are sold at craft fairs, juried craft shows and local boutiques. All of these designers must have a means to display their pieces at the point of sale, as well as to store and transport them. Private designers usually do not make many of one jewelry item, but may make earrings and then a matching necklace or pin, i.e., a variety of jewelry items. For these craftsmen, purchasing large numbers of display cards can be expensive and impractical. Additionally, to have such display cards properly scored and also printed with specific indicia is cost prohibitive. Private jewelry designers would benefit from having a personal device to make jewelry display cards for their individual pieces close at hand and also quick and easy to use.

One such personal device may be a hand held punch. Hand held punches have been available for a great many years. The most familiar may be the small punch used to make holes in paper so the paper can be inserted in to a loose leaf notebook. Today there are also punches that are used to make decorative cutouts of many shapes such as hearts, flowers, toy shapes and letters of the alphabet. These may be used by crafters and scrapbook devotees, as well as children making a variety of school projects. Most of these punches are designed to make the cutout. That is, the specifically shaped cutout itself is the desired goal of using these craft punches.

Chan, in U.S. Pat. No. 7,739,936, teaches a punch of a type used to make shapes such as a heart. This punch is designed with a wheel limiting the extent of movement between the upper and lower jaws of the die holder or support system so that the die, the cutting element, does not sustain damage during use through contact with the lower jaw. In U.S. Pat. No. 7,726,227, Chan describes the procedure used to make an injection molded base for a hand held punch. His base is made of a plastic and cast in one piece. A circular cutting blade is used to cut a horizontal slot into the base through which the paper is inserted.

In U.S. Pat. No. 6,428,248, Lee describes a punch to produce decorative cutouts. This punch incorporates a resilient ejector in the form of a band around the male cutter to assist in pushing out the desired cutout. Lee uses a single female die that mates with the male cutter. U.S. Patent Publication No. 2005/0039590 submitted by Weng describes a punch having a lever that can be folded when the punch is not in use. This punch also incorporates a single die through which the cutting element moves.

None of the prior art hand held punches are designed to make a jewelry display card. None of the prior art hand held punches produce the necessary slots and holes in an arrangement to enable a punched card to hold and display an article of jewelry.

There is a need for individual jewelry designers to be able to make their own jewelry display cards on which to mount their products. There is a need for such jewelry display cards to be made as needed to fulfill the individual requirements of each designer. There is a need for a personal device to make jewelry display cards so the designer does not have to buy and store many different cards in large quantities. There is a need for a personal device to make jewelry display cards from card stock having indicia printed thereon as determined by the individual jewelry designer. There is a need for an inexpensive and expeditious means to make such jewelry display cards.

BRIEF SUMMARY OF THE INVENTION

The present invention provides a personal device in the form of a hand-held punch for use in making individual jewelry display cards such that each card may be used for a single specific article of jewelry. Several different hand-held punches may be needed to accommodate all of the most common jewelry items. The invention may also include a kit containing everything needed to make a series of jewelry display cards. The kit may contain at least two hand held punches, each producing the specific pattern of apertures and/or slots necessary to mount and display a different item of jewelry. A packet of cards ready to be punched may also be included in the kit. The cards may be appropriately sized to accept the particular aperture pattern to hold and display the specific item of jewelry. The cards may also be pre-printed with various designs and/or indicia. The packet of cards may contain several cards in each of two or more designs or patterns or the packet may contain cards all having the same design or pattern. The hand-held punches may also be purchased separately and may be used to punch cards already in the possession of the user which may include the user's own business cards.

It is an object of the present invention to provide a means for a jewelry designer-craftsman to make his/her own jewelry display cards as needed.

It is another object of the present invention to provide a means for the jewelry designer-craftsman to make jewelry display cards from a variety of card stocks.

It is a further object of the present invention to provide a means for the jewelry designer-craftsman to purchase all of the materials necessary to make a series of jewelry display cards in a single kit.

It is an object of the present invention to provide a personal cutting device that will make the necessary apertures and/or slots in a piece of card stock so as to enable a particular item of jewelry to be displayed thereon.

Another object of the present invention is to provide the personal cutting device in the form of a simple hand-held punch that will make the necessary apertures and/or slots in a piece of card stock on which to display a particular item of jewelry.

A further object of the present invention is to have each hand-held punch exhibit indicia indicating the cut pattern that it will produce so the user can select the correct punch for the particular piece of jewelry.

A still further object of the present invention is that the hand-held punches can be used on the designer's own business cards so the piece of jewelry can be displayed together with the source identifier.

Another object of the present invention is to provide a simple and quick means to make a jewelry display card for a specific piece of jewelry thereby eliminating the need to purchase multiple types of cards in large quantities in order to accommodate all of the different articles of jewelry.

[The present invention is a personal cutting device to make a jewelry display card on which to mount a single article of jewelry. The device comprises cutting means for cutting at least two cut-outs in the form of apertures and/or slots in a piece of cardstock. The at least two apertures and/or slots are positioned and oriented to securely hold and display the single article of jewelry. There are also two identical securely mounted guiding means for guiding the cutting means and assisting in producing sharp cut-outs in the card stock, activating means for activating the cutting means, and housing means for containing the cutting means, the guiding means and the activating means.]

[The invention is also a personal cutting device to make a jewelry display card on which to mount a single article of jewelry. The device is in the form of a hand held punch which comprises a frame on which are securely mounted two templates, an upper template disposed directly above a lower template, the templates being spaced apart sufficiently to admit a piece of cardstock therebetween and having at least two apertures therethrough, the at least two apertures in the upper template being identical to and in substantial registry with the at least two apertures in the lower template, the at least two apertures configured to yield the same at least two apertures in the piece of cardstock thereby enabling the piece of cardstock to be usable to mount and display the single article of jewelry. There is also a spring biased movable member disposed above the templates from which depend at least two elongate cutting elements corresponding to and configured to pass through the at least two apertures in the templates with minimal tolerances thereby producing the at least two apertures in the piece of cardstock and simultaneously generating waste pieces of cardstock, means for biasing the movable member, an activation lever hingedly mounted on the frame and extending above the movable member such that when the lever is depressed the movable member is caused to descend and the at least two elongate cutting elements to pass through the at least two apertures in the templates and cut through the cardstock placed between the two templates. There is a housing to contain the frame, the movable member, the biasing means, and the activation lever, the activation lever extending outward therebeyond, and means for collecting the waste pieces of cardstock.]

[The invention includes a personal cutting device to make a jewelry display card on which to mount a single article of jewelry, the device in the form of a hand held punch, which comprises cutting means for cutting at least two cut-outs in the form of apertures and/or slots in a piece of cardstock, the at least two apertures and/or slots positioned and oriented to securely retain and display the single article of jewelry selected from the group consisting of a pair of post-type earrings, a pair of hook-type earrings, a necklace, a bracelet, a brooch and a barrette. The at least two apertures and/or slots are two horizontally aligned circular openings in the piece of cardstock to accommodate the pair of post-type earrings, two horizontally oriented opposing U-shaped openings in the piece of cardstock forming U-shaped tabs each with a centered circular opening to accommodate the pair of hook-type earrings, two diagonal slots beginning at opposing upper corners of the piece of cardstock and terminating in circular end portions to accommodate the necklace, two horizontal slots beginning substantially midway on opposing sides of the piece of cardstock and terminating in circular end portions to accommodate the bracelet, a ring of circular apertures substantially centered in the piece of cardstock to accommodate the brooch and a horizontal array of vertical slots substantially centered in the piece of cardstock to accommodate the barrette. There are also two identical guiding means securely mounted, one directly above the other, on a frame for guiding the cutting means and assisting in producing sharp cut-outs in the piece of card stock, activating means for activating the cutting means, and housing means for containing the cutting means, the guiding means and the activating means.]

*The present invention is a personal hand held punch for making a jewelry display card on which to mount at least one article of jewelry. The hand held punch comprises a housing having a base and an upper housing, a U-shaped frame having an upper member and a lower member, the lower member being disposed on the base of the housing, an upper template and a lower template, the upper template being mounted on the upper member of the U-shaped frame and the lower template being mounted on the lower member of the U-shaped frame such that the upper template is disposed directly above the lower template, the upper and lower templates being spaced apart sufficiently to admit a piece of cardstock therebetween and having at least two apertures therethrough, the at least two apertures in the upper template being identical to and in substantial registry with the at least two apertures in the lower template, and the at least two apertures are configured to yield the same at least two apertures in the piece of cardstock thereby enabling the piece of cardstock to be usable to mount and display the at least one article of jewelry. There are also a spring biased movable member disposed above the upper and lower templates, at least two elongate cutting elements extending from the spring biased movable member and corresponding to and configured to pass through the at least two apertures in the upper and lower templates with minimal tolerances thereby producing the at least two apertures in the piece of cardstock and simultaneously generating waste pieces of cardstock, means for biasing the movable member away from the upper and lower templates, the means for biasing the movable member being in contact with the spring biased movable member and an upper surface of the upper member of the U-shaped frame, an activation lever hingedly mounted on the upper member of the U-shaped frame and extending above the movable member such that when the activation lever is depressed, the activation lever displaces the movable member downward which causes the at least two elongate cutting elements to pass through the at least two apertures in the upper and lower templates and cut through the cardstock placed between the upper and lower templates, the activation lever having a hinged portion and an activation portion wherein the upper housing contains the upper member of the U-shaped frame, the movable member, the biasing means, and the hinged portion of the activation lever, and the actuation portion extends outward and beyond the upper housing; and means for collecting the waste pieces of cardstock.*

*The present invention is also a personal hand held punch for making a jewelry display card on which to mount at least one article of jewelry. The hand held punch comprises a housing having a base and an upper housing, a U-shaped frame having an upper member and a lower member, the lower member being disposed on the base of the housing, an upper template and a lower template, the upper template being mounted on the upper member of the U-shaped frame and the lower template being mounted on the lower member of the U-shaped frame such that the upper template is disposed directly above the lower template, the upper and lower templates being spaced apart sufficiently to admit a piece of cardstock therebetween and having at least two apertures therethrough, the at least two apertures in the upper template being identical to and in substantial registry with the at least two apertures in the lower template, and the at least two apertures are configured to yield the same at least two apertures in the piece of cardstock thereby enabling the piece of cardstock to be usable to mount and display the at least one article of jewelry. There are also a spring biased movable member disposed above the upper and lower templates, at least two elongate cutting elements extending from the spring biased movable member and corresponding to and configured to pass through the at least two apertures in the upper and lower templates with minimal tolerances thereby producing the at least two apertures in the piece of cardstock and simultaneously generating waste pieces of cardstock, means for biasing the movable member away from the upper and lower templates, the means for biasing the movable member being in contact with the spring biased movable member and an upper surface of the upper member of the U-shaped frame, an activation lever hingedly mounted on the upper member of the U-shaped frame and extending above the movable member such that when the activation lever is depressed, the activation lever displaces the movable member downward which causes the at least two elongate cutting elements to pass through the at least two apertures in the upper and lower templates and cut through the cardstock placed between the upper and lower templates, the activation lever having a hinged portion and an activation portion wherein the upper housing contains the upper member of the U-shaped frame, the movable member, the biasing means, and the hinged portion of the activation lever, and the actuation portion extends outward and beyond the upper housing; and a waste reservoir in the housing base beneath the lower template.*

Other features and advantages of the invention will be seen from the following description and drawings.

BRIEF DESCRIPTION OF THE DRAWINGS

FIG. 5 is a perspective exploded view of a hand held punch of the present invention;

FIG. 9 is a perspective view of the components of a kit of the present invention;

DETAILED DESCRIPTION OF THE INVENTION

When jewelry is presented for sale each item may be displayed on a card that has been imprinted with the score lines and perforations needed to produce the apertures and/or slits necessary to hold each particular jewelry item. Most of such jewelry display cards may be commercially manufactured using heavy duty stamping machines which produce multiple cards from a large piece of card stock. The present invention teaches the use of personal cutting devices to create individual jewelry display cards. These devices enable the craftsman or jewelry designer to create the appropriate card as the piece of jewelry is completed and negates the necessity of purchasing and storing extensive card inventories that the individual designer may not need or want.

Since each display card may hold one jewelry item, the card must be cut or punched with appropriate openings to hold and display the particular item. Typical items may be a pair of earrings, a brooch, a necklace, a bracelet and also a barrette. Each may require different cutting elements to prepare the appropriate display card.

Figure 1A:
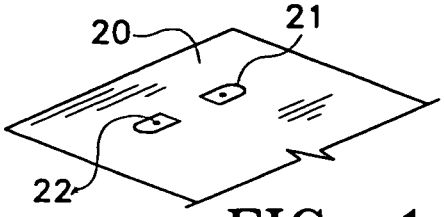
FIG. 1A (PRIOR ART)
FIG. 1A is a perspective view of a prior art stamped jewelry card.
Figure 1B:
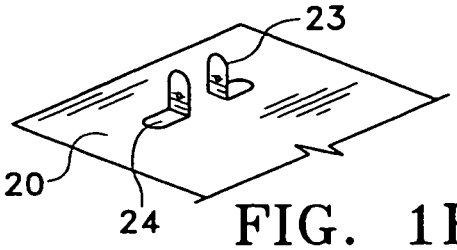
FIG. 1B (PRIOR ART)
FIG. 1B is a perspective view of the prior art stamped jewelry card of FIG. 1A with the earring support tabs lifted outward.

Prior art jewelry display cards 20 may be factory produced, as noted above, using heavy duty stamping machines. Such machines may utilize knife-like cutting elements that may make deep score lines and perforations, or may cut fine lines 21 and pin holes 22 into the card stock. FIG. 1A may show the fine cut line 21 and pin hole 22 produced by a commercial machine in making a jewelry display card with the fold out tabs 23 needed to display hook-type earrings. In FIG. 1B the tabs 23 have been lifted upward ready to receive the earrings. It can be seen in FIG. 1B that the openings 24 produced when the tabs 23 are lifted upward may be substantially the same size as the tabs 23. Commercial stamping machines rarely produce waste material so the cutting element must be sharp enough to make a clean cut through the card stock to produce a foldable tab. However, often the cut may not go completely through and a firm push from behind the tab may be necessary before the item can be mounted on the display card. The factory-made display cards may also make it necessary for the earring posts or hooks to be pushed firmly into the pinhole to open it before the earrings can be affixed to the card.

The individual jewelry designer may use a personal cutting device to prepare his/her own jewelry display cards as they are needed. Such a device may make the card specific to a particular jewelry item. Each particular jewelry item may require a card with a different pattern of apertures and/or slots designed to enable that item to be securely mounted on the card. A typical personal cutting device may be a hand held punch. A different hand held punch must be used for each particular jewelry item.

Figure 2A:
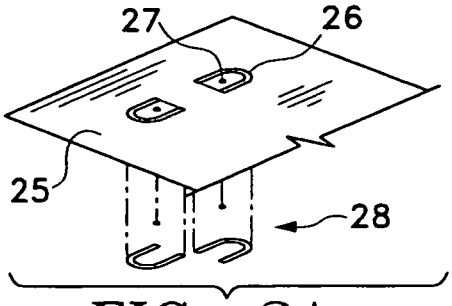
FIG. 2A is a perspective view of a punched jewelry card of the present invention showing the portions that have been removed during the punching process.
Figure 2B:
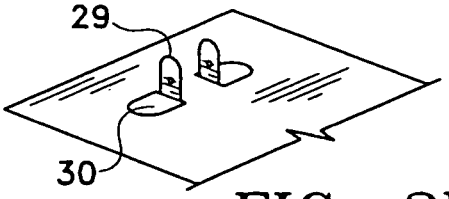
FIG. 2B is a perspective view of the punched jewelry card of FIG. 2A with the earring support tabs lifted outward.

In the designing of the hand-held punches of the present invention it was found that a knife-like cutting element could not sustain the repeated use with card stock of the thickness needed to retain its shape while supporting a jewelry item. It was necessary to use a more substantial cutting element. The cutting elements developed for the present invention produced actual openings, i.e., apertures and/or slots, in the card stock, not a fine knife-like cut or slit. FIG. 2A shows a card 25 punched using one of the hand-held punches of the present invention. This card 25 was also punched to receive a pair of hook-type earrings. The punch "lines" may be the same shape and placement as those made by a commercial stamping machine, but the cutting element used to cut the tab outline 26 and earring hole 27 may be more substantial then the knife-like blade and pin hole element used with the commercial stamping machine. This may result in having actual pieces of the card-stock, i.e., waste pieces 28, being removed. As can be seen in FIG. 2B, the resulting earring tab 29 may be visibly smaller than the opening 30 since a piece of the cardstock has been removed. An added advantage of having a piece of the cardstock removed during the punching is that the tab 29 may be free when formed and easier to lift. The user does not have to press the tab out from under the card as must be done with the prior art jewelry display cards 20. The tab 29 of the present invention can be lifted by simply inserting a fingernail into the open area 26 around the tab. Though use of a cutting element that generates waste material may be described for a hook-type earring display card, other hand-held jewelry display card punches may also require removing pieces of card stock rather than simply scoring the cardstock.

The construction of the hand-held punch 40 may be important because it must hold up well over time and continued use with card stock of various weights. A jewelry designer may purchase this punch 40 with these expectations. The hand-held punch 40 seen in FIG. 5 may have a sturdy U-shaped frame 41 [that may support two substantially identical cutting dies or templates 42 which may be set into the frame,]. *The U-shaped frame 41 may have an upper member and a lower member. Two substantially identical cutting dies or templates 42, an upper template and a lower template, may be supported on the U-shaped frame such that the upper template may be mounted on the upper member and the lower template may be mounted on the lower member. The two templates 42 may be mounted* one above the other, so that the openings 43, which may represent the shape of the cut-outs needed for a card designed to display a specific piece of jewelry, are perfectly aligned. The templates 42 may be spaced apart just enough to admit a piece of cardstock between them. This space 44 may be seen in FIGS. 5 and 9. The cutting elements 46 may be long enough to pass through both templates and may be sufficiently elongated for this purpose. They may be affixed to and supported by a movable member 45 disposed above the frame 41 in such a manner that the elongate cutting elements 46 pass through the openings 43 in both templates 42 cleanly with minimal tolerances. For the example illustrated in detail in FIG. 5, a punch to make a display card for hook-type earrings, there may be four elongate cutting elements 46 attached to the movable member 45, two U-shaped cutters 47 and two circular cutters 48.

The movable member 45 may be biased to move vertically above the templates 42. However, the biasing means must provide an even movement to maintain the elongate cutting elements in perfect vertical alignment to pass cleanly through the openings in the templates. There may be four short posts 50 (the lower posts) equidistantly spaced around the upper template on the top *of the upper member* of the *U-shaped* frame 41 and four similar short posts 51 (the upper posts) equidistantly spaced around the elongate cutting elements 46 on the lower surface of the movable member 45. The posts may be paired so that each upper post 51 may be disposed directly above a lower post 50. In cooperation with each pair of posts may be one of a set of four compression springs 52 which may bias the movable member 45. The four equidistantly placed compression springs may provide a more even movement then the single spring present in many of the prior art craft punches. A lever 53 may be hingedly attached to the upper surface *of the upper member* of the *U-shaped* frame 41. The lever 53 may be configured so that its under portions 54 may rest against the top of the movable member 45. When the lever 53 is pressed downward the movable member 45 may descend compressing the springs 52. The elongate cutting elements 46 may be lowered to pass through the openings 43 in the two templates 42 and cut through a piece of cardstock placed between the two templates 42. When the pressure on the lever is released, the movable member 45 may be returned to its resting position by the compression springs 52 and the elongate cutting elements may pass upward through the openings 43 in the templates 42.

The frame 41 and movable member 45 may be enclosed in a housing that may be constructed in two parts, an upper housing 55 and a lower housing or base 56. The two pieces may be held together by two screws 57 inserted from under the base 56. There may be a slot 58 in the upper housing 55 through which the lever may operate. The two parts of the housing may be so arranged to expose the space 44 between the templates through which to insert the cardstock into the punch.

There [must] *may* be a separate hand-held punch 40 to make the jewelry display card for each particular jewelry item. To indicate the cut pattern produced by each punch, the cut or template pattern may be imprinted as indicia 60 on the top surface 61 of the lever. This may be seen in FIGS. 3 and 9.

As noted above, prior art jewelry display cards may be made by large commercial stamping machines that use fine cutting elements that score and cut into the card stock creating pin holes, perforations, fold lines and slits that usually do not generate any waste material. Many such large-scale operations are not designed to handle waste cuttings so no cuttings are generated during those stamping operations. The user of these cards may have to push out the tabs and separate the slits, sometimes not too easily, before the jewelry can be affixed to the cards.

The hand-held punches developed for the present invention required considerable pressure to be exerted to depress the cutting elements to cut through the card stock. The required pressure was found to cause damage to a fine line or pin hole cutting element. This necessitated the development of sturdier cutting elements that produce holes and slots when the hand-held punches are used. The need for the sturdier cutting elements required designing specific templates and cutting elements for each of the individual hand-held punches needed to make the jewelry display cards for each of the common jewelry articles. The cutting elements may generate waste cuttings each time the punch is used. These punches were designed with a waste reservoir 32 in the bottom 33 of the housing base 56 directly under the openings in the *lower* template 42. A hand-held punch 40 may be seen in FIG. 3 with a card 35 inserted and ready to be punched and the waste cuttings 28 and reservoir 32 may be seen in FIG. 4.

Figure 4:
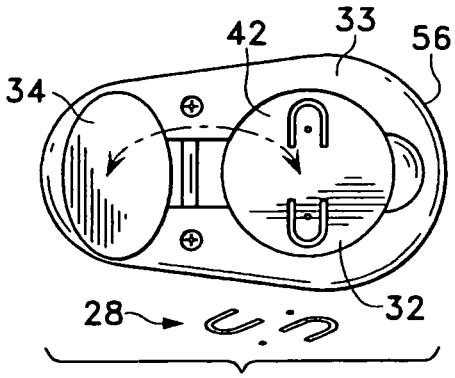
FIG. 4 is a bottom plan view of the hand-held punch showing the cutting template, open reservoir and punched out pieces from the card illustrated in FIGS. 2A and 2B.

The waste reservoir 32 may be closed by a hinged door 34 that can be opened to remove the waste cuttings 28 also seen in FIG. 4. The hand-held punches of the present invention may provide a transparent hinged door 34 so that the user can see when the reservoir 32 is ready to be emptied.

Figure 10:
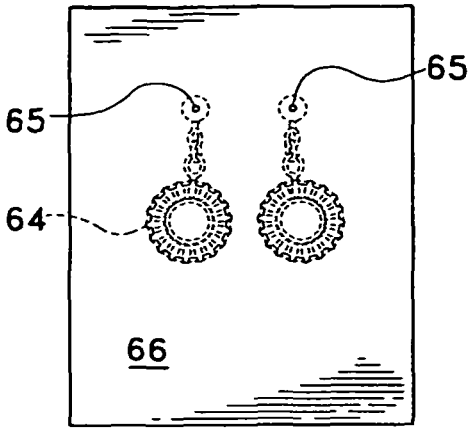
FIG. 10 is a front planar view of a jewelry display card exhibiting the hand held punch template pattern to accommodate a pair of post-type earrings.
Figure 11:
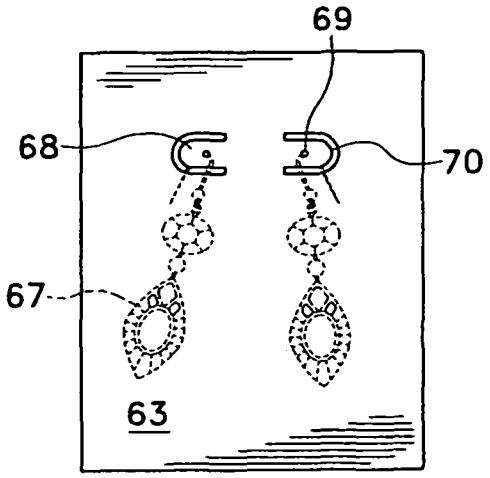
FIG. 11 is a front planar view of a jewelry display card exhibiting the hand held punch template pattern to accommodate a pair of hook-type earrings.

The hand held punch for each particular jewelry item may require a specific template design and corresponding cutting elements to generate the apertures and/or slots needed to display that item. For example, the templates and cutting elements needed for a hand-held punch to produce a display card for a pair of post-type earrings 64 may produce two small spaced apart holes 65 aligned horizontally in the punched card 66. See FIG. 10. This may require two appropriately spaced holes in the templates and, affixed to the movable member 45, two elongate circular cutting elements that pass through these holes. The circular cutting elements may make actual holes in the cards as opposed to the pin holes made by most stamping machines. To display hook-type earrings 67, fold-out tabs 68 with central holes 69 may be needed. The templates may have two opposing horizontally aligned U-shaped openings 70, each with a hole 69 in the center of the U-shape. The movable member 45 for this hand-held punch may have affixed to it two elongate cutting elements 46 capable of removing U-shaped waste cuttings and two elongate circular cutting elements 48 that each produce a small round waste cutting. The jewelry display card 63 made using this punch may be seen in FIG. 11.

Figure 12:
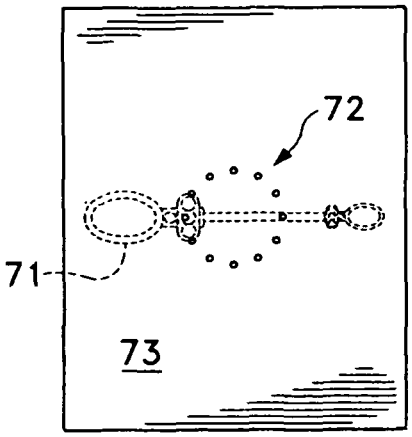
FIG. 12 is a front planar view of a jewelry display card exhibiting the hand held punch template pattern to accommodate a brooch.

The template design for a jewelry display card that can hold and display a brooch 71 may have a circle of punched holes 72 so that the pin element of the brooch 71 may be inserted into a hole 72 on one side of the circle and exit from a hole 72 on the other side. The circle configuration may be used so that the brooch may be displayed on the card according to its best orientation. The movable member for this punch may have a series of elongate round cutting elements arranged in a circular configuration to pass through a circle of round apertures in each of the two templates. A jewelry display card 73 made using a punch of this description may be seen in FIG. 12.

Figure 13:
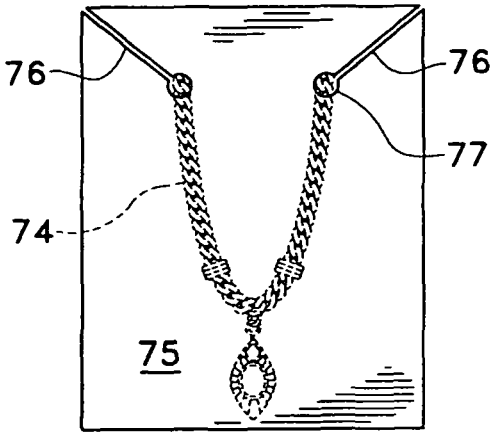
FIG. 13 is a front planar view of a jewelry display card exhibiting the hand held punch template pattern to accommodate a necklace.

Prior art jewelry display cards designed to hold a necklace 74 may usually have two opposing slits stamped into the sides of the card stock which must be hand separated when a necklace is to be inserted into the slits. The design for the template for the hand-held punch for a necklace display card 75 may have two slots 76 each emanating from an opposing upper corner, slanting downward and inward and terminating in a circular opening 77. The movable member may support two elongate cutting elements similarly configured and oriented. The two elongate cutting elements must be aligned exactly to pass through the shaped openings in the templates. The necklace 74 may be easily inserted into the two slots 76 and may depend from the circular openings 77 as may be seen in FIG. 13.

Figure 14:
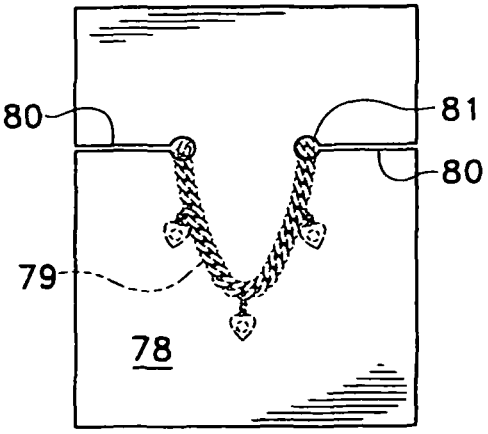
FIG. 14 is a front planar view of a jewelry display card exhibiting the hand held punch template pattern to accommodate a link-type bracelet.

The display card 78 for a bracelet 79 may be similar to that for the necklace, but this display card may have the two slots 80 oriented horizontally and emanating from opposing sides of the card 78. Again, the slots 80 may terminate in circular openings 81 from which the bracelet 79 may depend as seen in FIG. 14. The templates for this card may exhibit the two slots and there may be two elongate cutting elements of the same shape affixed to the movable member. The jewelry display card 78 shown here for bracelets may be for chain type and flexible bracelets.

Figure 15:
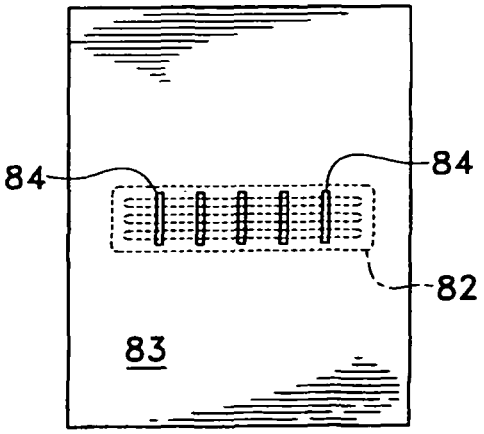
FIG. 15 is a front planar view of a jewelry display card exhibiting the hand held punch template pattern to accommodate a barrette.

Another item often displayed on cards and which may be made by individual craftsmen may be the barrette 82. A display card 83 designed to display the barrette 82 may have a series of vertical slots 84 in a horizontal array across the central portion of the card. The templates may have the array of vertical slots and the movable member may hold a series of similarly oriented and dimensioned elongate cutting elements. This card may be seen in FIG. 15. The clasp member of the barrette 82 may be inserted into one slot 84 and may exit through another slot 84. Barrettes 82 of varying sizes may easily be accommodated on this display card 83.

The template design pattern for each of the hand-held punches described above may have indicia 60 on the lever 61 in the shape of the cutout pattern made by that punch. Since these punches actually form slots or real openings in the card it may be much easier to mount the jewelry items on these cards then on the commercially stamped cards where the tabs and slits must be hand opened or pushed outward before they can be used.

Though the series of hand held punches exhibiting specific templates and elongate cutting elements have been described in detail to make individual jewelry display cards, other forms of personal punching or cutting devices may be used to produce jewelry display cards conforming to the patterns described above. *As noted, each of the hand-held punches of the present invention is designed to produce a jewelry card to hold one item of jewelry. However, a card may have more than one pattern punched into it so that more than one jewelry item may be displayed on the same card. The hand held punches of the present invention may be used in any manner the designer wishes.*

The hand-held punches of the present invention may be designed for use with card stock up to 120 pound weight. As a frame of reference, scrapbook cardstock may be 80-120 pound weight and most business cards may be 80 pound weight.

The jewelry item to be displayed may determine the size of the card, though even a standard business card may be used to display many jewelry items. The particular jewelry item may also dictate the size and placement of the openings produced by the hand-held punches. Examples of the actual sizes of some of the tabs and openings produced by the hand-held punches may be noted with the punches designed for earrings. Lever-back and hook-type earrings may be displayed on cards with the U-shaped tabs situated approximately 1.0 inch (2.54 cm) from the edge of the card. Each punched area may be 1.50 inch (3.8 cm) wide and 0.25 inch (0.64 cm) high with the central holes 1⁄16 inch (0.2 cm) in diameter. The punch for the post-type earrings may produce openings that are 1.0 inch (2.54 cm) from the edge of the card. The actual holes may be about 1.0 inch (2.54 cm) apart and 1⁄16 inch (0.2 cm) in diameter.

The present invention may include a kit that 90 that contains all of the materials needed to create cards on which to hold and display jewelry items. Each kit 90 may contain at least two hand-held punches 40, each producing the pattern of apertures and/or slots needed to hold and display a different item of jewelry, a packet of cards 92, and a case or container 93 to hold the components. The cards may all be of the same design and have the same indicia, or there may be a packet which contains several series of cards with different patterns and/or sets of indicia. The cards may also be without indicia but may be of different colors. The packets 92 may each contain a specific number of cards, for example a typical kit 90 may have a packet of 25 cards. Refill packets may be available at the point of sale of the kits. The kit 90 may also include one or more sheets of instructions and/or suggestions (not illustrated).

Figure 8:
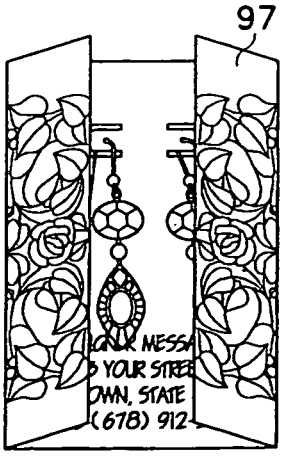
FIG. 8 is a front perspective view of a punched card with folded portions holding a pair of hook-type earrings.

The cards supplied in a typical kit may be made from all natural recycled fiber in the form of 80 pound cardstock. These cards may be sized to hold and display the particular item of jewelry for which the punches included in that kit may be designed. For example, a display card for a pair of earrings may be smaller than a display card for a necklace or brooch. The cards may also be of different colors, patterns, shapes or designs. Special cards 97 may also be provided with pre-scored fold lines so that once punched they may form stands or enclosures for the jewelry item. See FIG. 8.

Figure 3:
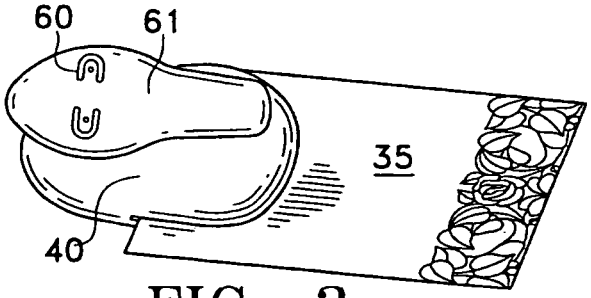
FIG. 3 is perspective view of a hand-held jewelry card punch in use with a decorative card.
Figure 6:
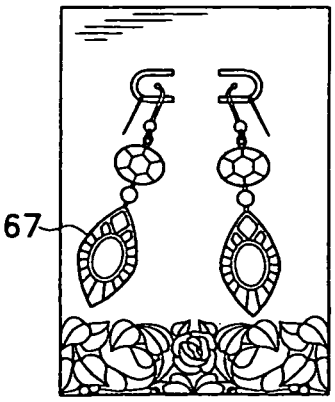
FIG. 6 is a front planar view of a punched card holding a pair of hook-type earrings.
Figure 7:
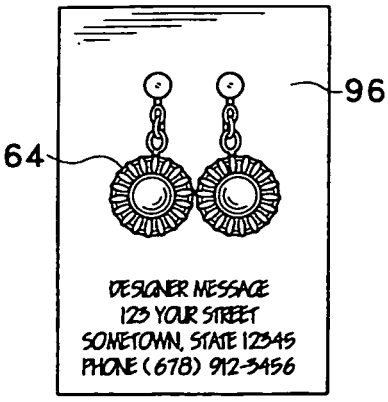
FIG. 7 is a front planar view of a punched card holding a pair of post-type earrings.

The cards shown in FIGS. 3 and 6 may display a floral design near the bottom. Any designs or indicia may be used. An advantage of the hand-held punches 40 may be to enable the designer to use his or her special business card 96 as a jewelry display card by simply punching the business card 96 with the proper punch for the particular piece of jewelry to be displayed. A business card 96 punched to display a pair of post-type earrings 64 may be seen in FIG. 7. The artisan may also design his or her own business cards or special display cards as to size, color and indicia. In that case the appropriate hand-held punch may be chosen for the particular completed jewelry item and the card punched accordingly. This may enable the designer to completely customize all of his or her products and displays to include the product source information.

Though the hand-held punches 40 may be purchased in a kit 90, it may be preferable to have each punch 40 packaged separately. The packaging 91 may be aesthetic, but it may also form an enclosure to protect the punches. One form of packaging may have a see-through cover 94 over a cardboard base 95 as seen in FIG. 9. If special instruction sheets are not included in the kit, the cardboard base 95 may be printed with indicia which may include instructions, illustrations and product source information.

The frame 41, templates 42, movable member 45 and elongate cutting elements 46 of the hand held punches 40 of the present invention may be made of metal and must be strong and well formed. The elongate cutting elements 46 may have sharp cutting edges to produce clean cuts for an aesthetically acceptable display card and may be constructed to retain their cutting edges over repeated use. The housing 55, 56 and lever 53 may be made of a strong and durable plastic. The housing may be made in any color or colors. Each individual punch 40 may have the template design 60 on the top surface 61 of the lever 53 so the user may select the appropriate punch to make the card on which the completed item is to be displayed.

The overall size of a punch may be determined by the template and therefore the various punches may exhibit a range of sizes. For example, the punch designed for a pair of post earrings may be 3 inches (7.6 cm) long, 1⅞ inches (4.8 cm) wide at its widest point and 2 inches (5 cm) high. The punch designed for a pair of hook-type earrings may be 4 inches (10.2 cm) long, 2¼ inches (5.7 cm) wide at its widest point and 2⅜ inches (6 cm) high.

Each kit may contain at least two punches, but there can be more than two punches and more than one packet of cards. The market for the kits may determine just how they are apportioned. Another kit may contain a full set of all punches and several packets of variously sized cards.

While one basic embodiment of the present invention and a kit containing the punches have been illustrated and described in detail, it is to be understood that this invention is not limited thereto and may be otherwise practiced within the scope of the following claims.

I claim:

1. A personal hand held punch for making a jewelry display card on which to mount [a single] *at least one* article of jewelry, the hand held punch comprising:

a housing having a base and an upper housing;

a U-shaped frame [mounted] *having an upper member and a lower member, said lower member being disposed* on the base of the housing;

an upper template and a lower template, said upper template *being mounted on the upper member of the U-shaped frame* and said lower template being mounted on *the lower member of* the U-shaped frame, said upper template disposed directly above said lower template, said upper and lower templates being spaced apart sufficiently to admit a piece of cardstock therebetween and having at least two apertures therethrough, the at least two apertures in the upper template being identical to and in substantial registry with the at least two apertures in the lower template, said at least two apertures configured to yield the same at least two apertures in the piece of cardstock thereby enabling said piece of cardstock to be usable to mount and display the [single] *at least one* article of jewelry;

a spring biased movable member disposed above the upper and lower templates, at least two elongate cutting elements extending from the spring biased moveable member and corresponding to and configured to pass through the at least two apertures in said upper and lower templates with minimal tolerances thereby producing the at least two apertures in the piece of cardstock and simultaneously generating waste pieces of cardstock;

means for biasing said movable member away from the upper and lower templates, the means for biasing said movable member being in contact with the spring biased moveable member and an upper surface of the *upper member of the* U-shaped frame;

an activation lever hingedly mounted on said *upper member of the* U-shaped frame and extending above said movable member such that when said activation lever is depressed, the activation lever displaces the movable member downward which causes the at least two elongate cutting elements to pass through the at least two apertures in the upper and lower templates and cut through the cardstock placed between the upper and lower templates, the activation lever having a hinged portion and an actuation portion;

wherein the upper housing contains the *upper member of the* U-shaped frame, the movable member, the biasing means, and the hinged portion of the activation lever, and the actuation portion extends outward and beyond the upper housing; and means for collecting the waste pieces of cardstock.

2. [A device to make] *The hand held punch for making* a jewelry display card as described in claim 1 wherein the apertures in the templates are designed to produce a jewelry display card for [a single] *at least one* article of jewelry selected from the group consisting of: a pair of post-type earrings, a pair of hook-type earrings, a necklace, a bracelet, a brooch, and a barrette.

3. [A device to make] *The hand held punch for making* a jewelry display card as described in claim 1 wherein the templates and elongate cutting elements produce two horizontally aligned circular openings in the piece of cardstock such that a pair of post-type earrings can be mounted thereon.

4. [A device to make] *The hand held punch for making* a jewelry display card as described in claim 1 wherein the templates and elongate cutting elements produce two horizontally oriented opposing U-shaped openings forming U-shaped tabs, each tab with a centered circular opening, in the piece of cardstock such that a pair of hook-type earrings can be mounted thereon.

5. [A device to make] *The hand held punch for making* a jewelry display card as described in claim 1 wherein the templates and elongate cutting elements produce two diagonal slots beginning at opposing upper corners of the piece of cardstock and terminating in circular end portions such that a necklace can be mounted and hung from the two circular end portions.

6. [A device to make] *The hand held punch for making* a jewelry display card as described in claim 1 wherein the templates and elongate cutting elements produce two horizontal slots beginning substantially midway on opposing sides of the piece of cardstock and terminating in circular end portions such that a bracelet can be mounted and hung from the two circular end portions.

7. [A device to make] *The hand held punch for making* a jewelry display card as described in claim 1 wherein the templates and elongate cutting elements produce a ring of circular apertures substantially centered in the piece of cardstock such that a brooch can be mounted thereon by inserting a pin element of said brooch into one circular aperture and having the pin element exit through an opposing circular aperture.

8. [A device to make] *The hand held punch for making* a jewelry display card as described in claim 1 wherein the templates and elongate cutting elements produce a horizontal array of vertical slots substantially centered in the piece of cardstock such that a barrette can be mounted thereon by inserting a clasp element of said barrette into one vertical slot and having the clasp element exit through another vertical slot.

*9. A personal hand held punch for making a jewelry display card on which to mount at least one article of jewelry, the hand held punch comprising:*

*a housing having a base and an upper housing;*

*a U-shaped frame having an upper member and a lower member, said lower member being disposed on the base of the housing;*

*an upper template and a lower template, said upper template being mounted on the upper member of the U-shaped frame and said lower template being mounted on the lower member of the U-shaped frame such that said upper template is disposed directly above said lower template, said upper and lower templates being spaced apart sufficiently to admit a piece of cardstock therebetween and having at least two apertures therethrough, the at least two apertures in the upper template being identical to and in substantial registry with the at least two apertures in the lower template, said at least two apertures configured to yield the same at least two apertures in the piece of cardstock thereby enabling said piece of cardstock to be usable to mount and display the at least one article of jewelry;*

*a spring biased movable member disposed above the upper and lower templates, at least two elongate cut-*

*ting elements extending from the spring biased movable member and corresponding to and configured to pass through the at least two apertures in said upper and lower templates with minimal tolerances thereby producing the at least two apertures in the piece of cardstock and simultaneously generating waste pieces of cardstock;*

*means for biasing said movable member away from the upper and lower templates, the means for biasing said movable member being in contact with the spring biased movable member and an upper surface of the upper member of the U-shaped frame;*

*an activation lever hingedly mounted on said upper member of the U-shaped frame and extending above said movable member such that when said activation lever is depressed, the activation lever displaces the movable member downward which causes the at least two elongate cutting elements to pass through the at least two apertures in the upper and lower templates and cut through the cardstock placed between the upper and lower templates, the activation lever having a hinged portion and an activation portion;*

*wherein the upper housing contains the upper member of the U-shaped frame, the movable member, the biasing means, and the hinged portion of the activation lever, and the actuation portion extends outward and beyond the upper housing; and*

*a waste reservoir in the housing base beneath the lower template.*

* * * * *